US008738048B2

(12) United States Patent
Lim

(10) Patent No.: US 8,738,048 B2
(45) Date of Patent: May 27, 2014

(54) METHOD OF UPDATING USER PRESENCE INFORMATION IN MOBILE INSTANT MESSAGING AND MOBILE TERMINAL USING THE SAME

(75) Inventor: Jeong Kyu Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 588 days.

(21) Appl. No.: 12/590,867

(22) Filed: Nov. 16, 2009

(65) Prior Publication Data

US 2010/0130180 A1  May 27, 2010

(30) Foreign Application Priority Data

Nov. 24, 2008  (KR) .......................... 10-2008-0116640

(51) Int. Cl.
*H04W 4/00* (2009.01)
*G06F 15/16* (2006.01)
*H04L 12/66* (2006.01)
*G06F 3/00* (2006.01)

(52) U.S. Cl.
USPC ............ 455/466; 709/206; 370/352; 715/752

(58) Field of Classification Search
USPC ........... 709/206, 229, 246; 370/352; 455/466; 715/752

See application file for complete search history.

(56) References Cited

U.S. PATENT DOCUMENTS

| 6,976,092 | B1* | 12/2005 | Daniell et al. ................. 709/246 |
| 7,548,756 | B2* | 6/2009 | Velthuis et al. ............... 455/466 |
| 2003/0018726 | A1* | 1/2003 | Low et al. ...................... 709/206 |
| 2004/0024822 | A1* | 2/2004 | Werndorfer et al. .......... 709/206 |
| 2004/0193686 | A1* | 9/2004 | Blagsvedt et al. ............ 709/206 |
| 2004/0267942 | A1 | 12/2004 | Maes |
| 2005/0210113 | A1 | 9/2005 | Kasuga et al. |
| 2006/0013205 | A1* | 1/2006 | Daniell et al. ................. 370/352 |
| 2006/0271696 | A1* | 11/2006 | Chen et al. .................... 709/229 |
| 2008/0184170 | A1* | 7/2008 | Periyalwar ..................... 715/841 |

FOREIGN PATENT DOCUMENTS

WO   WO 2004/064306 A2   7/2004
WO   WO 2008/131632 A1   11/2008

OTHER PUBLICATIONS

European Search Report dated Feb. 19, 2010 in related European Patent Application No. 09173098.6.

* cited by examiner

*Primary Examiner* — Jinsong Hu
*Assistant Examiner* — William Nealon

(57) ABSTRACT

A mobile terminal is capable of updating user presence information in mobile instant messaging. The mobile terminal and associated method facilitate updating user presence information in multiple sessions of mobile instant messaging. The method includes: joining multiple IM communities; issuing a command for presence information update in relation to one of the multiple IM communities; and sending a request for presence information update to IM servers of two or more IM communities including the IM community indicated by the issued update command, among the multiple IM communities.

20 Claims, 9 Drawing Sheets

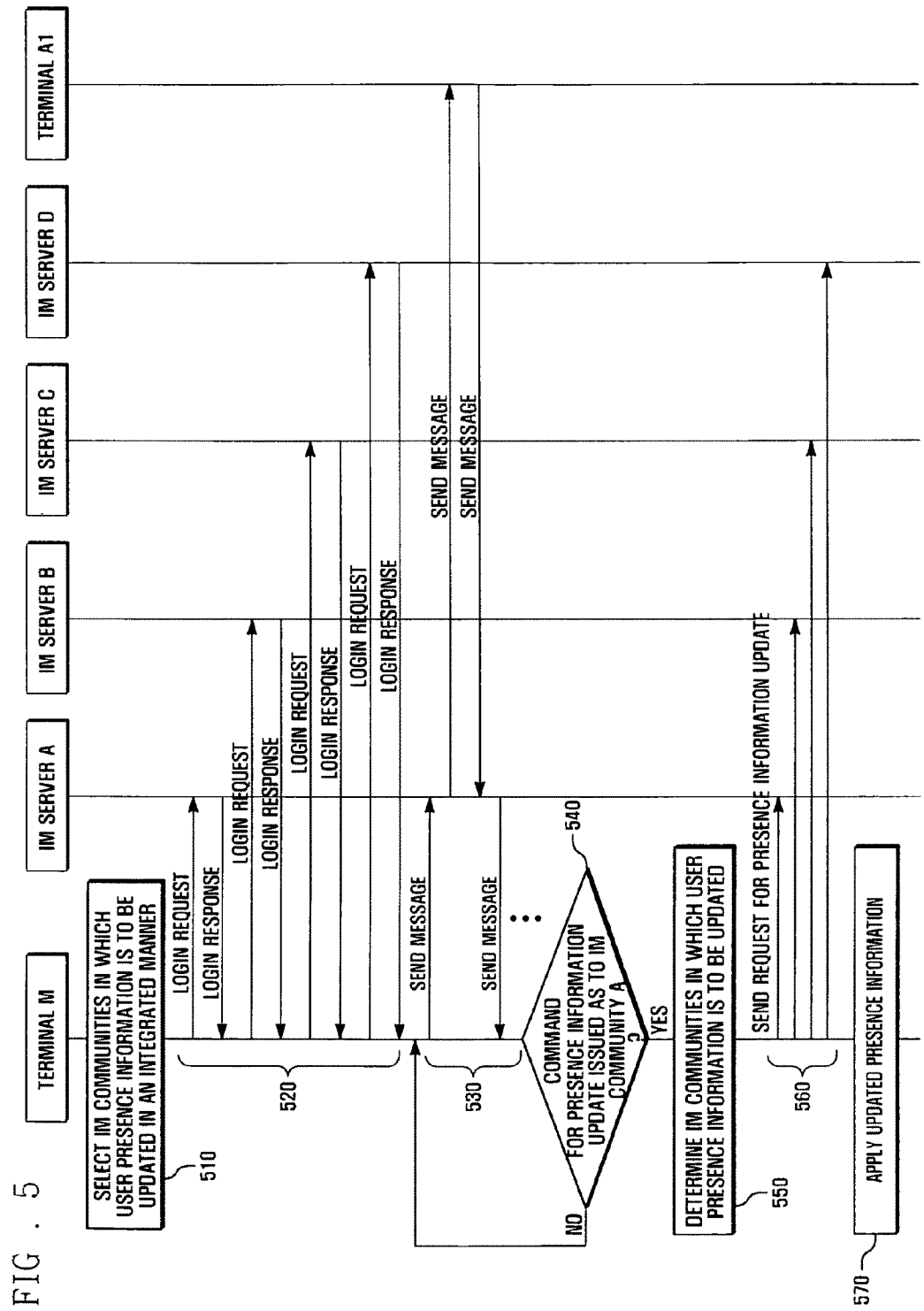

FIG. 8

| IM Community A | IM Community B | IM Community C |
|---|---|---|
| Available | Online | Available |
| Away | Busy | Away |
| Invisible | Appear offline | Invisible |

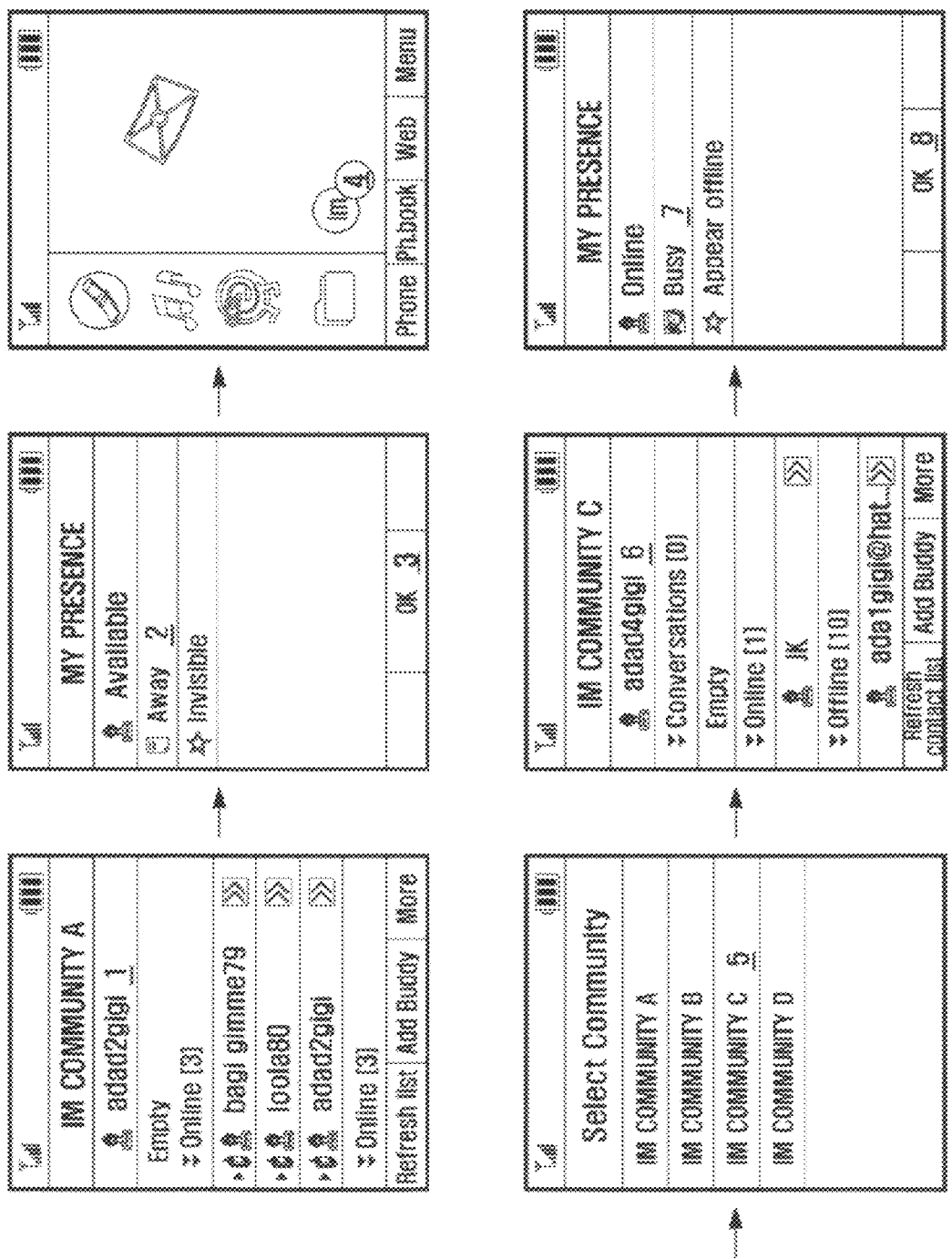

METHOD OF UPDATING USER PRESENCE INFORMATION IN MOBILE INSTANT MESSAGING AND MOBILE TERMINAL USING THE SAME

CROSS-REFERENCE TO RELATED APPLICATION(S) AND CLAIM OF PRIORITY

The present application is related to and claims priority to an application entitled "METHOD OF UPDATING USER PRESENCE INFORMATION IN MOBILE INSTANT MESSAGING AND MOBILE TERMINAL USING THE SAME" filed in the Korean Intellectual Property Office on Nov. 24, 2008 and assigned Serial No. 10-2008-0116640, the contents of which are incorporated herein by reference.

TECHNICAL FIELD OF THE INVENTION

The present invention relates generally to a mobile terminal and, more particularly, to a method for updating presence information on users involved in multiple sessions of mobile instant messaging and to a mobile terminal using the same.

BACKGROUND OF THE INVENTION

In recent years, mobile terminals have been widely popularized and become one of the necessities of life. With advances in communication technologies, mobile terminals can provide not only functions related to call processing and message handling but also functions related to Instant Messaging (IM), which has been supported by personal computers. In particular, a recently developed mobile terminal permits the user to join multiple IM communities at the same time, and the user can simultaneously receive two or more IM services.

During using an IM service, a user can set presence information to notify other users of the presence status, and may update the presence information using a presence information setting menu.

FIG. 9 illustrates screen representations of a multi-session presence information update according to a conventional procedure.

As illustrated in FIG. 9, to change the presence status to 'Away' in conversation with "IM community A", the user touches a menu for presence information setting 1, touches 'Away' for selection 2, and touches 'OK' for updating 3. Then, to change the presence status to 'Busy' for "IM community C", the user touches an item for IM community selection 4, touches "IM community C" for selection 5, touches a menu for presence information setting 6, touches 'Busy' for selection 7, and touches 'OK' for updating 8.

That is, to change the presence information for two IM communities, the user has to perform eight touch operations. If the user has joined four IM communities, the user may have to perform 18 touch operations to update presence information. With the increasing number of IM communities, the user may have to perform a large number of touch operations to change the presence status.

Even when the user joins multiple IM communities, the user is the same, and hence has preferably the same presence status for all the multiple IM communities. However, in related art technology, when the user desires to change the presence status for multiple IM communities, the user has to change the presence status for one of the IM communities at a time. Thereby, the user may be inconvenienced by having to perform a large number of manipulations.

Accordingly, in updating the user presence status for multiple IM communities, it is necessary to provide a means to reduce the number of user manipulations.

SUMMARY OF THE INVENTION

To address the above-discussed deficiencies of the prior art, it is a primary object to provide a method that can reduce the number of user manipulations in updating user presence information for multiple IM communities. The present invention also provides a mobile terminal using the method.

In accordance with an exemplary embodiment of the present invention, there is provided a method of updating user presence information in instant messaging for a mobile terminal, including: joining multiple IM communities; issuing a command for presence information update in relation to one of the multiple IM communities; and sending a request for presence information update to IM servers of two or more IM communities including the IM community indicated by the issued update command, among the multiple IM communities.

The method may further include selecting, before or after joining IM communities, one or more IM communities in which user presence information is to be updated in an integrated manner.

Selecting one or more IM communities may include: displaying a menu for activating or deactivating integrated update mode; and determining, when the integrated update mode is activated, all IM communities in which a user is permitted to participate or has participated as IM communities in which the user presence information is to be updated.

Alternatively, selecting one or more IM communities may include: displaying a list of IM communities in which a user is permitted to participate or has participated; selecting one or more of the listed IM communities; and determining the selected IM communities as IM communities in which the user presence information is to be updated.

In accordance with another exemplary embodiment of the present invention, there is provided a mobile terminal supporting instant messaging (IM), including: a radio frequency unit communicating with an IM server; and a control unit controlling when a command for presence information update is issued in relation to one of multiple IM communities that a user has joined, the radio frequency unit configured to send a request for presence information update to IM servers of two or more IM communities including an IM community indicated by the issued update command.

The mobile terminal may further include a storage unit storing information regarding IM communities in which user presence information is to be updated in an integrated manner.

In a feature of the present invention, the user joining multiple IM communities can update presence information for the IM communities with reduce number of manipulations.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates a sequence diagram for the first method of updating user presence information with respect to mobile terminals and IM servers;

FIG. 8 illustrates descriptors of user status in different IM communities; and

FIG. 9 illustrates screen representations illustrating multi-session presence information update according to a related art procedure.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

In the description, an IM community is a community of subscribers formed on the basis of an IM service provider. Representative IM communities include 'AIM®', 'ICQ®', 'Window Live', and 'Yahoo®' communities. Each IM community includes an IM server and IM clients, and the IM clients can receive IM services through the IM server.

The 'presence information' (or 'presence status') of a user utilizing an IM service indicates the current status of the user. The presence information is a criterion for other users desiring message transmission. Different IM communities may have different sets of descriptors for the presence status. For example, a set of descriptors including 'Online', 'Away' and 'Invisible' may be employed in an IM community, and a set of descriptors including 'Available', 'Busy' and 'Appear Offline' may be employed in another IM community.

Figure 1:
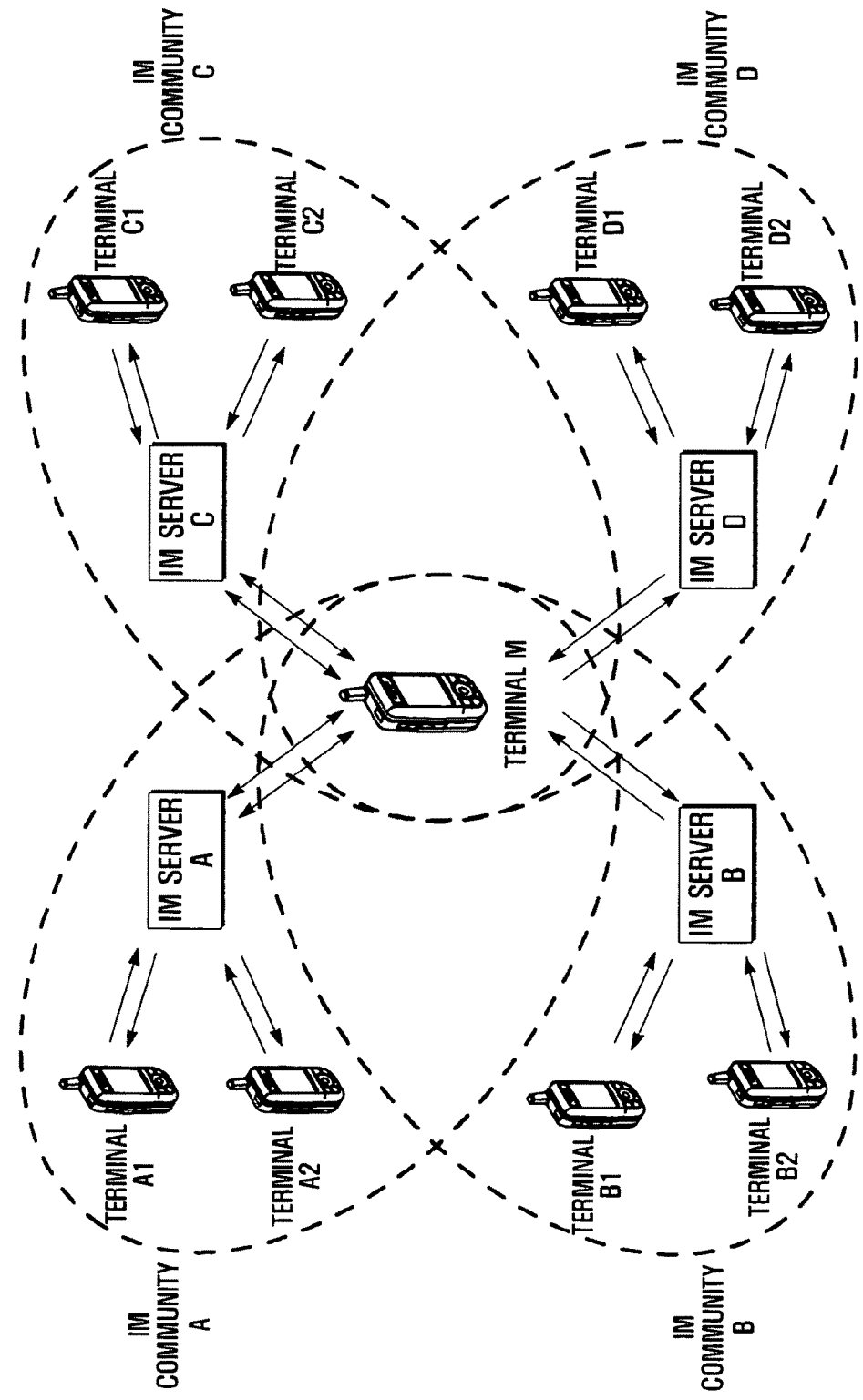
FIG. 1 illustrates a mobile terminal joining multiple sessions with different IM communities.

FIG. 1 illustrates a mobile terminal joining multiple sessions with different IM communities.

In FIG. 1, a terminal M has joined an IM community A, IM community B, IM community C, and IM community D. The IM community A is composed of an IM server A, and multiple IM clients including the terminal M, terminal A1 and terminal A2. An IM community may include as many IM clients as the number of subscribers. The terminal M can send and receive a message to and from the terminal A1 and terminal A2 through the IM server A.

Similarly to the IM community A, the IM community B includes an IM server B and terminals B1 and B2 as IM clients, and the IM community C includes an IM server C and terminals C1 and C2 as IM clients, and the IM community D includes an IM server D and terminals D1 and D2 as IM clients. To change user presence information, the terminal M sends a presence status update request to the IM servers A, B, C and D.

Figure 2:
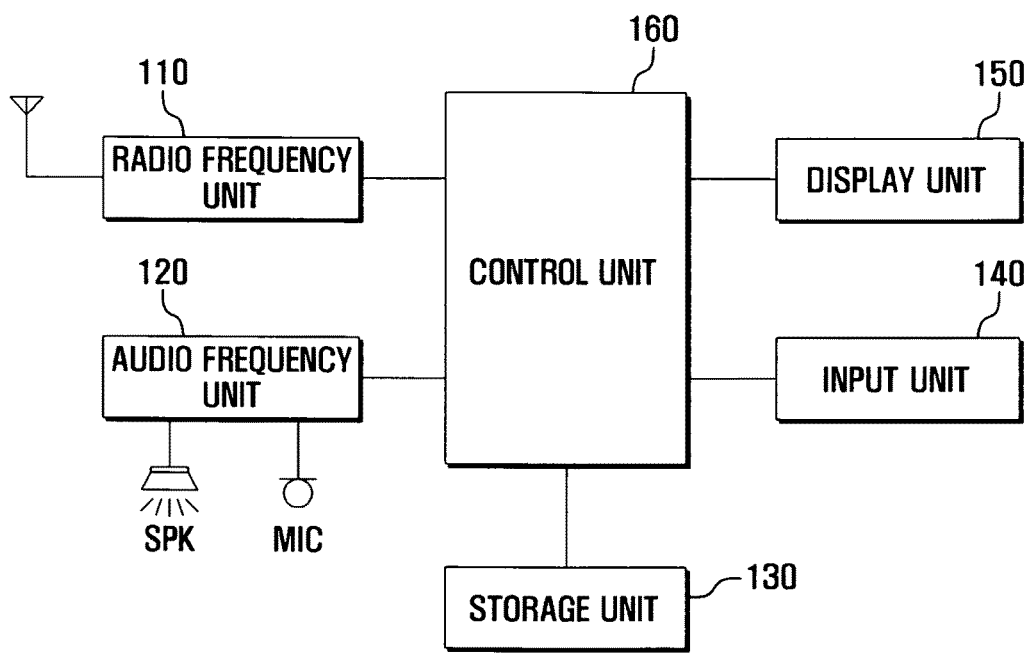
FIG. 2 illustrates a block diagram of a mobile terminal capable of IM functions according to an exemplary embodiment of the present invention.

FIG. 2 illustrates a block diagram of a mobile terminal capable of IM functions according to an exemplary embodiment of the present invention.

In FIG. 2, a radio frequency unit 110 performs a wireless communication operation for the mobile terminal. The radio frequency unit 110 may include a radio frequency (RF) transmitter for up-converting the frequency of a signal to be transmitted and amplifying the signal, and an RF receiver for low-noise amplifying a received signal and down-converting the frequency of the received signal. The radio frequency unit 110 can receive data through a wireless channel and output the data to a control unit 160, and can send data from the control unit 160 through the wireless channel to the outside. In particular, the radio frequency unit 110 performs wireless communication with a base station connected to an IM server through an information and communication network (for example, an IP network such as a TCP/IP based wired network or a WAP based wireless network) to enable data communication between the mobile terminal and the IM server.

An audio processing unit 120 may include a coder/decoder (codec). The codec may have a data codec for processing packet data and the like, and an audio codec for processing an audio signal such as a voice signal. In call processing, the audio processing unit 120 converts a digital audio signal into an analog signal through the audio codec to reproduce the analog signal through a speaker SPK, and converts an analog audio signal from a microphone MIC into a digital audio signal through the audio codec for transmission.

A storage unit 130 stores programs for executing functions of the mobile terminal, contents, and data generated by the user. In particular, the storage unit 130 stores assorted descriptors for the presence status in joinable IM communities. For example, status descriptors 'Available' and 'Online' indicate the same state. The storage unit 130 also stores information regarding those IM communities in which user presence information is to be updated in an integrated manner.

An input unit 140 receives an input signal for controlling the mobile terminal from the user, and forwards the input signal to the control unit 160. The input unit 140 may include a key pad or touch pad, and further include a plurality of alphanumeric and function keys for inputting alphanumeric information and for setting various functions. In particular, through the input unit 140, the user can select IM communities in which user presence information is to be updated in an integrated manner, and input a command for updating user presence information in the selected IM communities.

A display unit 150 may include a panel of Liquid Crystal Display (LCD) devices, and visually provides the user with menus of the mobile terminal, data input by the user, function setting information, and the like. In particular, the display unit 150 displays an IM service screen, on which user presence information and information on online subscribers and offline subscribers can be listed. The display unit 150 also displays an IM setting menu, which may include items for setting an automatic join option, user presence information, and a sound option.

The control unit 160 controls the overall operation of the mobile terminal. Particularly, in response to an input command for IM setting, the control unit 160 controls the display unit 150 to display an IM setting menu, which includes a presence information setting submenu, which includes an item for integrated update mode selection. After the presence information is set, the control unit 160 stores the presence information in the storage unit 130. When a command for presence information update is issued while the user has joined multiple IM communities, the control unit 160 sends a request for presence information update to, according to the settings, the IM server of a particular IM community indicated by the issued command, the IM servers of all the IM communities to which the user belongs, or the IM servers of those IM communities selected by the user.

Hereinabove, the configuration of the mobile terminal is described. Next, a description is provided of a method of updating user presence information in IM communities. The mobile terminal of the present invention is capable of joining multiple IM communities, and maintains a standardized set of descriptors for the user presence status in different IM communities.

FIG. 8 illustrates descriptors of user presence status in different IM communities. In an IM community A, presence status of a user is indicated by 'Available', 'Away', and 'Invisible'. In an IM community B, presence status is indicated by 'Online', 'Busy', and 'Appear offline'. In an IM community C, presence status is indicated by 'Available', 'Away', and 'Invisible'. Descriptors 'Available' and 'Online' refer to the same presence status, and 'Away' and 'Busy' refer to the same presence status. In the following description, it is assumed that the mobile terminal maintains a standardized set of descriptors for the user presence status.

Figure 3:
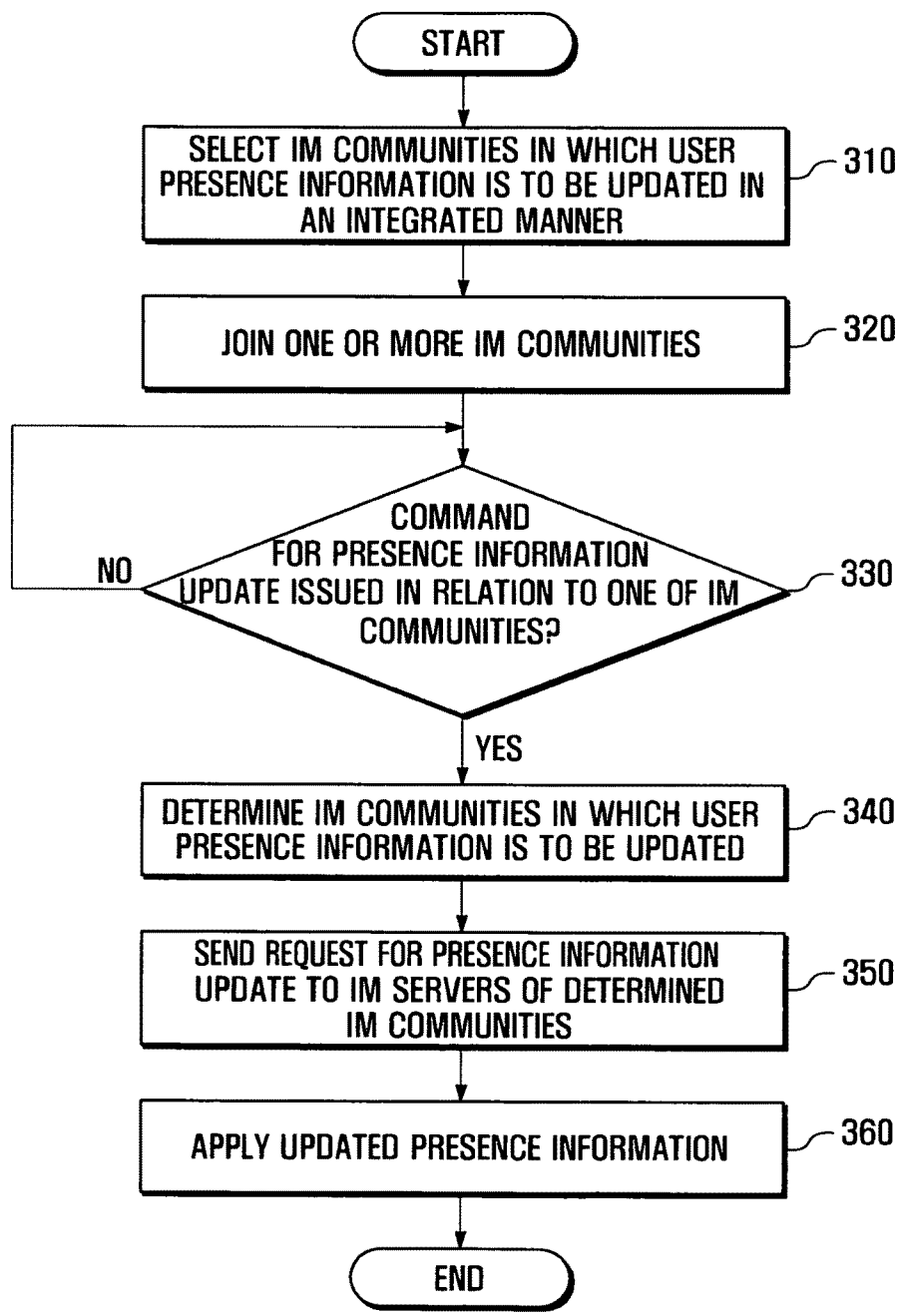
FIG. 3 illustrates a flow chart for a first method of updating user presence information for a mobile terminal joining multiple IM communities according to another exemplary embodiment of the present invention.

FIG. 3 illustrates a flow chart for a first method of updating user presence information for a mobile terminal participating in multiple IM communities.

Referring to FIG. 3, the control unit 160 of the mobile terminal selects those IM communities in which user presence information is to be updated in an integrated manner (step 310). In response to selection of an IM setting item through the input unit 140, the display unit 150 displays an IM setting menu.

Figure 6A:
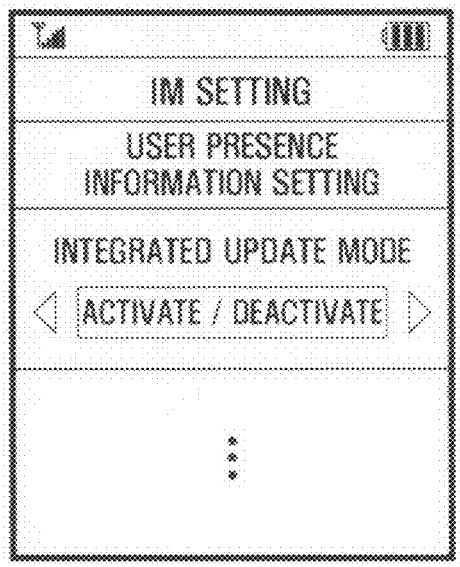
FIG. 6A illustrates an IM setting menu for the first and second methods according to embodiments of the present disclosure.
Figure 6B:
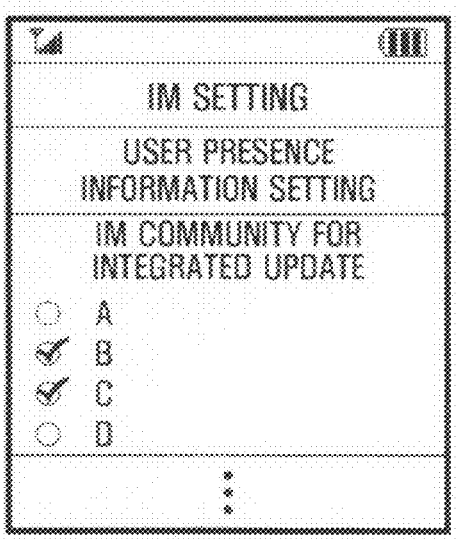
FIG. 6B illustrates an IM setting menu for the first method according to embodiments of the present disclosure.

FIGS. 6A and 6B illustrate an IM setting menu. The IM setting menu may include items for setting automatic logins, sound, user presence information, and the like. For the purpose of description, those items directly related to user presence information setting are illustrated in the IM setting menus of FIGS. 6A and 6B. In FIG. 6A, a menu item is provided to set an integrated update mode for user presence information. The user can activate and deactivate the integrated update mode for user presence information through the menu.

In FIG. 6B, another IM setting menu is illustrated for integrated user presence information update. The IM setting menu includes a list of IM communities that the user may join together with associated selection marks. The user can select through the menu one or more IM communities for integrated presence information update, and information on the selected IM communities is stored in the storage unit 130.

Thereafter, when the user issues a command for joining an IM community through the input unit 140, the control unit 160 controls the radio frequency unit 110 to send a join request to the IM server of the IM community (step 320). Upon reception of a response corresponding to the join request from the IM server, the mobile terminal becomes a member of the IM community. The mobile terminal may participate in multiple IM communities, and step 320 may be repeated accordingly. After joining an IM community, the control unit 160 can control the radio frequency unit 110 to send and receive a message to and from the IM server of the IM community.

The control unit 160 checks whether a command for presence information update is issued in relation to one of the IM communities that the user has joined (step 330). An IM server relays communication between mobile terminals for message delivery. The user may issue a command for presence information update immediately after joining an IM community.

If a command for presence information update is issued, the control unit 160 refers to settings for user presence information update stored in the storage unit 130 to determine IM communities in which user presence information is to be updated (step 340). When the integrated update mode is activated at step 310, the control unit 160 determines those IM communities to which the user belongs, among IM communities that the user may join, as IM communities in which the user presence information is to be updated. When the integrated update mode is deactivated, the control unit 160 determines the only IM community indicated by the presence information update command as an IM community in which the user presence information is to be updated.

When IM communities in which user presence information is to be updated in an integrated manner are selected as shown in FIG. 6B, the control unit 160 determines those IM communities to which the user belongs, among the selected IM communities, as IM communities in which the user presence information is to be updated. Here, the IM community indicated by a presence information update command is regarded by default as an IM community in which the user presence information is to be updated.

The control unit 160 sends a request for presence information update to the IM server of each determined IM community in which user presence information is to be updated (step 350). The control unit 160 controls the radio frequency unit 110 to send a request for presence information update to the corresponding IM servers. In response to the request, each IM server updates the presence information of the requesting mobile terminal. The control unit 160 controls the display unit 150 to display the updated presence information (step 360). For example, even when the user issues a command for presence information update for an IM community A, the updated presence information is also applied to another IM community B.

Figure 4:
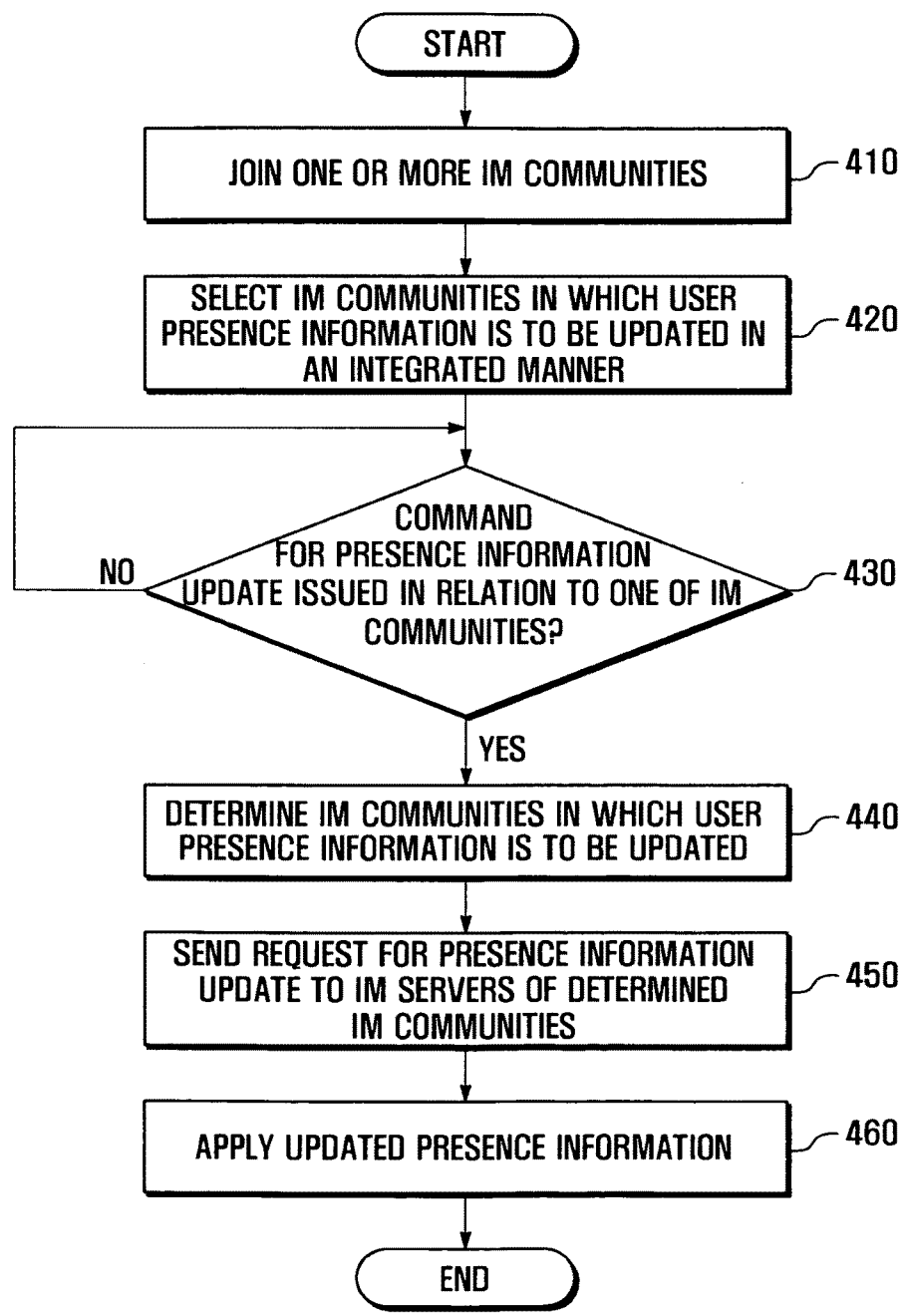
FIG. 4 illustrates a flow chart for a second method of updating user presence information for a mobile terminal joining multiple IM communities according to another exemplary embodiment of the present invention.

FIG. 4 illustrates a flow chart for a second method of updating user presence information for a mobile terminal participating in multiple IM communities.

When the user issues a command for joining an IM community through the input unit 140, the control unit 160 controls the radio frequency unit 110 to send a join request to the IM server of the IM community (step 410). Upon reception of a response corresponding to the join request from the IM server, the mobile terminal becomes a member of the IM community. The mobile terminal may participate in multiple IM communities, and step 410 may be repeated accordingly.

Thereafter, in response to selection of an IM setting item through the input unit 140, the control unit 160 controls the display unit 150 to display an IM setting menu, and selects those IM communities in which user presence information is to be updated in an integrated manner (step 420).

Figure 6C:
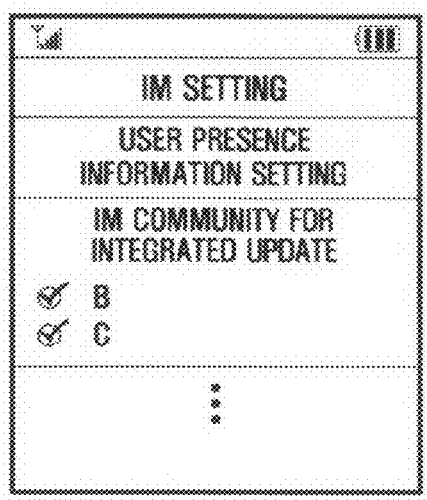
FIG. 6C illustrates an IM setting menu for the second method according to embodiments of the present disclosure.

FIGS. 6A and 6C illustrate an IM setting menu. The IM setting menu may include items for setting automatic logins, sound, user presence information, and the like. In FIG. 6A, a menu item is provided to set an integrated update mode for user presence information. The user can activate and deactivate the integrated update mode for user presence information through the menu.

FIG. 6C illustrates another IM setting menu for selecting IM communities individually. In FIG. 6C, IM communities in which the user currently participates are listed. That is, when IM communities in which the user may join are IM communities A, B, C and D, and the user participates in the IM communities B and C, only the IM communities B and C are listed in the IM setting menu.

The control unit 160 checks whether a command for presence information update is issued in relation to one of the IM communities the user has joined (step 430). After joining an IM community, the control unit 160 can control the radio frequency unit 110 to send and receive a message to and from the IM server of the IM community. An IM server relays communication between mobile terminals for message delivery. The user may issue a command for presence information update immediately after joining an IM community.

If a command for presence information update is issued, the control unit 160 refers to settings for user presence information update stored in the storage unit 130 to determine IM communities in which user presence information is to be updated (step 440). When the integrated update mode is activated at step 420, the control unit 160 determines those IM communities to which the user belongs as IM communities in which the user presence information is to be updated. When the integrated update mode is deactivated, the control unit 160 determines that only the IM community indicated by the presence information update command is an IM community in which the user presence information is to be updated. When IM communities in which user presence information is to be updated in an integrated manner are selected by the user as shown in FIG. 6C, the control unit 160 determines the selected IM communities as IM communities in which the user presence information is to be updated. Here, the IM community indicated by a presence information update command is regarded by default as an IM community in which the user presence information is to be updated.

The control unit 160 sends a request for presence information update to the IM server of each determined IM community in which user presence information is to be updated (step 450). The control unit 160 controls the radio frequency unit 110 to send a request for presence information update to the corresponding IM servers. In response to the request, each IM server updates the presence information of the requesting mobile terminal. The control unit 160 controls the display unit 150 to display the updated presence information (step 460).

FIG. 5 is a sequence diagram illustrating the first method of updating user presence information with respect to mobile terminals and IM servers.

The terminal M selects IM communities in which user presence information is to be updated (step 510). For example, it can be assumed that IM communities A, B, C and D are selected.

The terminal M logs in to the IM servers A, B, C and D in sequence (step 520). In step 520, the terminal M sends a login request to the IM servers A, B, C and D, and, in return, each of the IM servers A, B, C and D checks the identity of the user and sends a login response to the terminal M.

The terminal M sends and receives a message to and from another terminal through a logged IM server. In FIG. 5, the terminal M sends and receives a message to and from a terminal A1 through the IM server A.

The user of the terminal M may enter a command for user presence information to change the presence information. When a command for presence information update is issued (step 540), the terminal M determines IM communities in which user presence information is to be updated (step 550). As the IM communities A, B, C and D are selected at step 510 and the terminal M participates in all the IM communities A, B, C and D, the IM communities in which user presence information is to be updated are the IM communities A, B, C and D.

The terminal M sends a request for presence information update to the IM servers A, B, C and D (step 560). In response to the request, each of the IM servers A, B, C and D updates the presence information of the user of the terminal M. The terminal M adopts the updated presence information (step 570). The updated presence information is applied to all the IM communities A, B, C and D.

Figure 7:
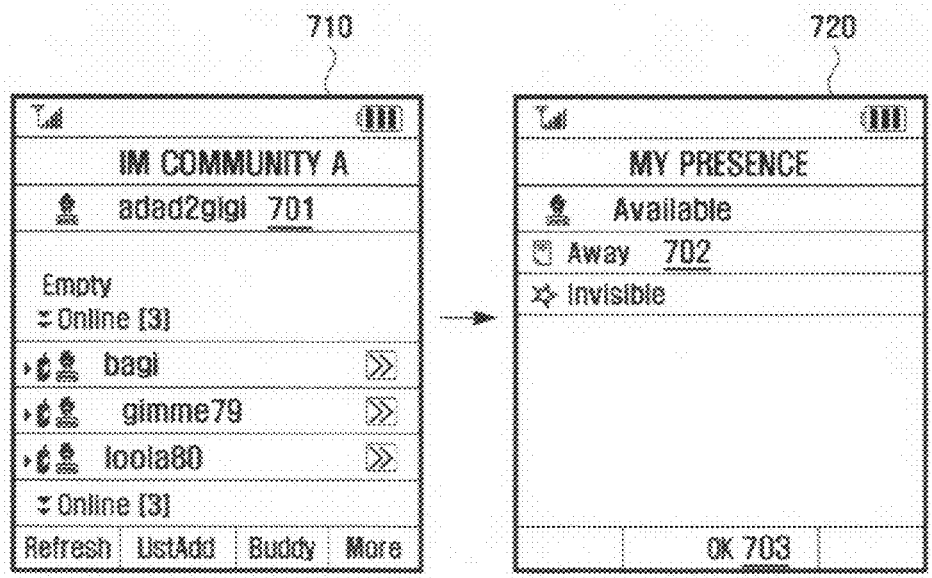
FIG. 7 illustrates screen representations illustrating presence information update according to the method of the present invention.

FIG. 7 illustrates screen representations illustrating presence information update according to the method of the present invention.

It is assumed that the IM communities A to D are selected for integrated user presence information update and the user participates in the IM communities A to D.

While participating in the IM communities A to D, the user desires to change the presence status from 'Available' to 'Away'. Reference symbol 710 indicates a screen for a service related to the IM community A. In the screen 710, user ID (adad2gigi), user status (icon on the left of user ID) and other online subscriber IDs (bagi, gimme79, loola80) are displayed. Offline subscribers and other function related icons may also be listed. In the screen 710, the user touches a portion where the user ID is displayed 701. This corresponds to entering into a menu for setting user status information. Then, a screen 720 is displayed for setting user status information. In the screen 720, the user can select one of 'Available', 'Away' and 'Invisible'. To change the presence status to 'Away' for some reason, the user touches 'Away' 702 and then touches 'OK' 703. In this example, as the IM communities A to D are selected for integrated user presence information update and the user participates in the IM communities A to D, the mobile terminal recognizes this command for presence information update for the IM community A as a command for presence information update for all the IM communities A to D. Hence, the mobile terminal sends a request for presence information update to the IM servers A to D.

In changing user presence information for four IM communities, whereas a related art procedure may require 18 user manipulations, the procedure of the present invention requires only three user manipulations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of updating user presence information in instant messaging (IM) for a mobile terminal, the method comprising:
joining multiple IM communities;
issuing a command for presence information update in relation to one of the multiple IM communities;
determining a subset of the multiple IM communities to send a request for presence information update, the subset including the IM community indicated by the issued update command; and
sending the request for presence information update to IM servers of the determined subset of the multiple IM communities.

2. The method of claim 1, further comprising selecting, prior to joining IM communities, one or more IM communities in which user presence information is to be updated in an integrated manner.

3. The method of claim 2, wherein selecting one or more IM communities comprises:
displaying a menu for activating or deactivating integrated update mode; and
determining, when the integrated update mode is activated, all IM communities in which a user is permitted to participate as IM communities in which the user presence information is to be updated.

4. The method of claim 2, wherein selecting one or more IM communities comprises:
displaying a list of IM communities in which a user is permitted to participate;
selecting at least one of the listed IM communities; and
determining the selected IM communities as the subset of the multiple IM communities in which the user presence information is to be updated.

5. The method of claim 2, wherein sending a request for presence information update comprises sending a request for presence information update to the IM server of the IM community indicated by the issued update command and to an IM server of at least one IM community selected as an IM community in which user presence information is to be updated in an integrated manner.

6. The method of claim 1, wherein in sending a request for presence information update, the user presence information indicated by the issued update command is identical to or corresponds to that used in the IM servers.

7. The method of claim 1, further comprising selecting, after joining IM communities, at least one IM community in which user presence information is to be updated in an integrated manner.

8. The method of claim 7, wherein selecting at least one IM community comprises:
displaying a menu for activating or deactivating an integrated update mode; and
determining, when the integrated update mode is activated, all IM communities that a user has joined as IM communities in which the user presence information is to be updated.

9. The method of claim 7, wherein selecting at least one IM community comprises:
displaying a list of IM communities that a user has joined;
selecting one or more of the listed IM communities; and
determining the selected IM communities as IM communities in which the user presence information is to be updated.

10. The method of claim 7, wherein sending a request for presence information update comprises sending a request for presence information update to the IM server of the IM community indicated by the issued update command and to an IM server of at least one IM community selected as an IM community in which user presence information is to be updated in an integrated manner.

11. A mobile terminal supporting instant messaging (IM), the mobile terminal comprising:
a radio frequency unit configured to communicate with an IM server; and
a control unit configured to, in response to a command for presence information update is issued in relation to one of multiple IM communities that a user has joined, determine a subset of the multiple IM communities to send a request for presence information update, the subset including the IM community indicated by the issued update command, and to cause the radio frequency unit to send a request for presence information update to IM servers of two or more IM communities including an IM community indicated by the issued update command.

12. The mobile terminal of claim 11, further comprising a storage unit configured to store information regarding IM communities in which user presence information is to be updated in an integrated manner.

13. The mobile terminal of claim 12, wherein the storage unit is configured to store assorted data on descriptors for user presence status used in multiple IM communities.

14. The mobile terminal of claim 11, wherein the control unit is configured to receive a selection of one or more IM communities as IM communities in which user presence information is to be updated in an integrated manner.

15. The mobile terminal of claim 14, wherein the control unit is configured to send a request for presence information update to IM servers of, among the IM communities that a user has joined, the IM community indicated by the issued update command and at least one of the IM communities selected as IM communities in which user presence information is to be updated in an integrated manner.

16. A wireless communication network comprising a plurality of mobile terminals capable of supporting instant messaging (IM), at least one mobile terminal comprising:
a radio frequency unit configured to communicate with an IM server; and
a control unit configured to, in response to a command for presence information update is issued in relation to one of multiple IM communities that a user has joined, determine a subset of the multiple IM communities to send a request for presence information update, the subset including the IM community indicated by the issued update command, and to cause the radio frequency unit to send a request for presence information update to IM servers of two or more IM communities including an IM community indicated by the issued update command.

17. The network of claim 16, further comprising a storage unit configured to store information regarding IM communities in which user presence information is to be updated in an integrated manner.

18. The network of claim 17, wherein the storage unit is configured to store assorted data on descriptors for user presence status used in multiple IM communities.

19. The network of claim 16, wherein the control unit is configured to receive a selection of one or more IM communities as IM communities in which user presence information is to be updated in an integrated manner.

20. The network of claim 19, wherein the control unit is configured to send a request for presence information update to IM servers of, among the IM communities that a user has joined, the IM community indicated by the issued update command and at least one of the IM communities selected as IM communities in which user presence information is to be updated in an integrated manner.

\* \* \* \* \*